(12) United States Patent
Jaradi et al.

(10) Patent No.: US 10,703,328 B2
(45) Date of Patent: Jul. 7, 2020

(54) SEATBELT GUIDE ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 130 days.

(21) Appl. No.: 15/829,354

(22) Filed: Dec. 1, 2017

(65) Prior Publication Data

US 2019/0168707 A1 Jun. 6, 2019

(51) Int. Cl.
| | | |
|---|---|---|
| *B60R 22/20* | (2006.01) | |
| *B60R 21/013* | (2006.01) | |
| *B60R 22/24* | (2006.01) | |
| *B60R 22/18* | (2006.01) | |
| *B60R 21/01* | (2006.01) | |

(52) U.S. Cl.
CPC ............ *B60R 22/20* (2013.01); *B60R 21/013* (2013.01); *B60R 22/201* (2013.01); *B60R 22/206* (2013.01); *B60R 22/24* (2013.01); *B60R 2021/01265* (2013.01); *B60R 2022/1818* (2013.01); *B60R 2022/1831* (2013.01); *B60R 2022/207* (2013.01); *B60R 2022/208* (2013.01)

(58) Field of Classification Search
CPC ....... B60R 22/20; B60R 21/013; B60R 22/24; B60R 22/1954; B60R 22/1955; B60R 2021/01265; B60R 2021/01279; B60R 2022/208; B60R 2022/1818
See application file for complete search history.

(56) References Cited

U.S. PATENT DOCUMENTS

| | | | | |
|---|---|---|---|---|
| 3,567,247 A * | 3/1971 | Sobkow et al. | ...... | B60R 22/024 280/808 |
| 4,213,638 A * | 7/1980 | Sacco | ...... | B60R 22/20 280/801.2 |
| 4,378,947 A * | 4/1983 | Fohl | ...... | B60R 22/24 24/163 R |
| 5,431,448 A * | 7/1995 | Ball | ...... | B60R 22/20 280/801.1 |
| 7,448,646 B2 * | 11/2008 | Hall | ...... | B60R 21/2338 280/739 |
| 7,513,532 B1 | 4/2009 | Vaughns, Sr. et al. | | |
| 8,262,133 B2 | 9/2012 | Usoro et al. | | |
| 9,399,444 B2 | 7/2016 | Warner | | |
| 2004/0256167 A1 * | 12/2004 | Becker | ...... | B60R 22/03 180/268 |

(Continued)

FOREIGN PATENT DOCUMENTS

| | | |
|---|---|---|
| EP | 1495925 A1 | 1/2005 |
| JP | 2007253734 A | 10/2007 |
| JP | 2009298382 A | 12/2009 |

*Primary Examiner* — Frank B Vanaman
(74) *Attorney, Agent, or Firm* — Frank A. MacKenzie; Bejin Bieneman PLC (57) ABSTRACT

An assembly includes a webbing. The assembly includes a first webbing guide receiving the webbing. The assembly includes a second webbing guide receiving the webbing and releasably secured to the first webbing guide. The assembly includes an actuator. The assembly includes a cable secured to the actuator and to the second webbing guide.

17 Claims, 8 Drawing Sheets

(56) References Cited

U.S. PATENT DOCUMENTS

| | | | | |
|---|---|---|---|---|
| 2011/0316321 A1* | 12/2011 | Kujawa | ................ | B60N 2/688 |
| | | | | 297/468 |
| 2017/0129449 A1* | 5/2017 | Stegerer | ................ | B60R 22/03 |
| 2017/0225644 A1 | 8/2017 | Jaradi et al. | | |
| 2017/0225648 A1* | 8/2017 | Yamabe | ................ | B60R 22/26 |
| 2019/0054892 A1* | 2/2019 | Sharif | .................... | B60R 22/20 |

* cited by examiner

SEATBELT GUIDE ASSEMBLY

BACKGROUND

The seatbelt portion of a vehicle restraint system secures the occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Controlling or reducing these loads may reduce the risk of occupant injury during a collision.

DETAILED DESCRIPTION

An assembly includes a webbing. The assembly includes a first webbing guide receiving the webbing. The assembly includes a second webbing guide receiving the webbing and releasably secured to the first webbing guide. The assembly includes an actuator. The assembly includes a cable secured to the actuator and to the second webbing guide.

The second webbing guide may be designed to release from the first webbing guide upon application of a force not less than 200 pounds to the second webbing guide.

The first webbing guide may define a slot, and the second webbing guide may define a slot that is larger than the slot of the first webbing guide.

The actuator may include a pyrotechnic.

The second webbing guide may include a first end, a second end spaced from the first end, and may define a slot elongated between the first end and the second end, the second webbing guide may be releasably secured to the first webbing guide at the first end and the second end.

The actuator may include a track having a first end and a second end, and a slide body slidable along the track from the first end to the second end.

The actuator may include a stop at the second end of the track.

The second webbing guide may define a slot including end portions and an intermediate portion between the end portions, the end portions being wider than the intermediate portion.

The first webbing guide and the second webbing guide may be monolithic.

The assembly may include a frangible member breakable relative to the first webbing guide and the second webbing guide and releasably securing the first webbing guide to the second webbing guide.

The first webbing guide may define a hole, and the second webbing guide may include a frangible stake breakable relative to the first webbing guide and the second webbing guide and engaged with the hole.

The assembly may include a vehicle pillar, and the first webbing guide may be supported by the vehicle pillar.

The vehicle pillar may include a panel and a trim cover, and the cable may be disposed between the panel and the trim cover.

The trim cover may include a tear seam adjacent the cable.

The assembly may include a vehicle roof, and the actuator may be supported by the vehicle roof.

The vehicle roof may include a panel and a trim cover, and the actuator may be disposed between the panel and the trim cover.

The trim cover may include a tear seam adjacent the actuator.

The assembly may include a processor and a memory, the memory storing instructions executable by the processor to actuate the actuator upon detecting a vehicle impact.

The cable may include an end secured to the actuator and moveable from a first position to a second position that is in a vehicle forward direction relative to the first position.

The actuator may be located in a vehicle forward position relative to the first webbing guide.

With reference to the Figures, wherein like numerals indicate like parts throughout the several views, a seatbelt assembly 20 for a vehicle 22 includes a webbing 24. The seatbelt assembly 20 includes a first webbing guide 26 receiving the webbing 24. The seatbelt assembly 20 includes a second webbing guide 28 receiving the webbing 24 and releasably secured to the first webbing guide 26. The seatbelt assembly 20 includes an actuator 30. The seatbelt assembly 20 includes a cable 32 secured to the actuator 30 and to the second webbing guide 28.

Actuation of the actuator 30 releases the second webbing guide 28 from the first webbing guide 26. Once released, the second webbing guide 28 draws the webbing 24 away from a seat 34 to create slack in the webbing 24 relative to an occupant in the seat 34 and restrained by the seatbelt assembly 20, e.g., reducing a likelihood of injury to the occupant's chest and/or abdomen during impacts to the vehicle 22.

Figure 1:
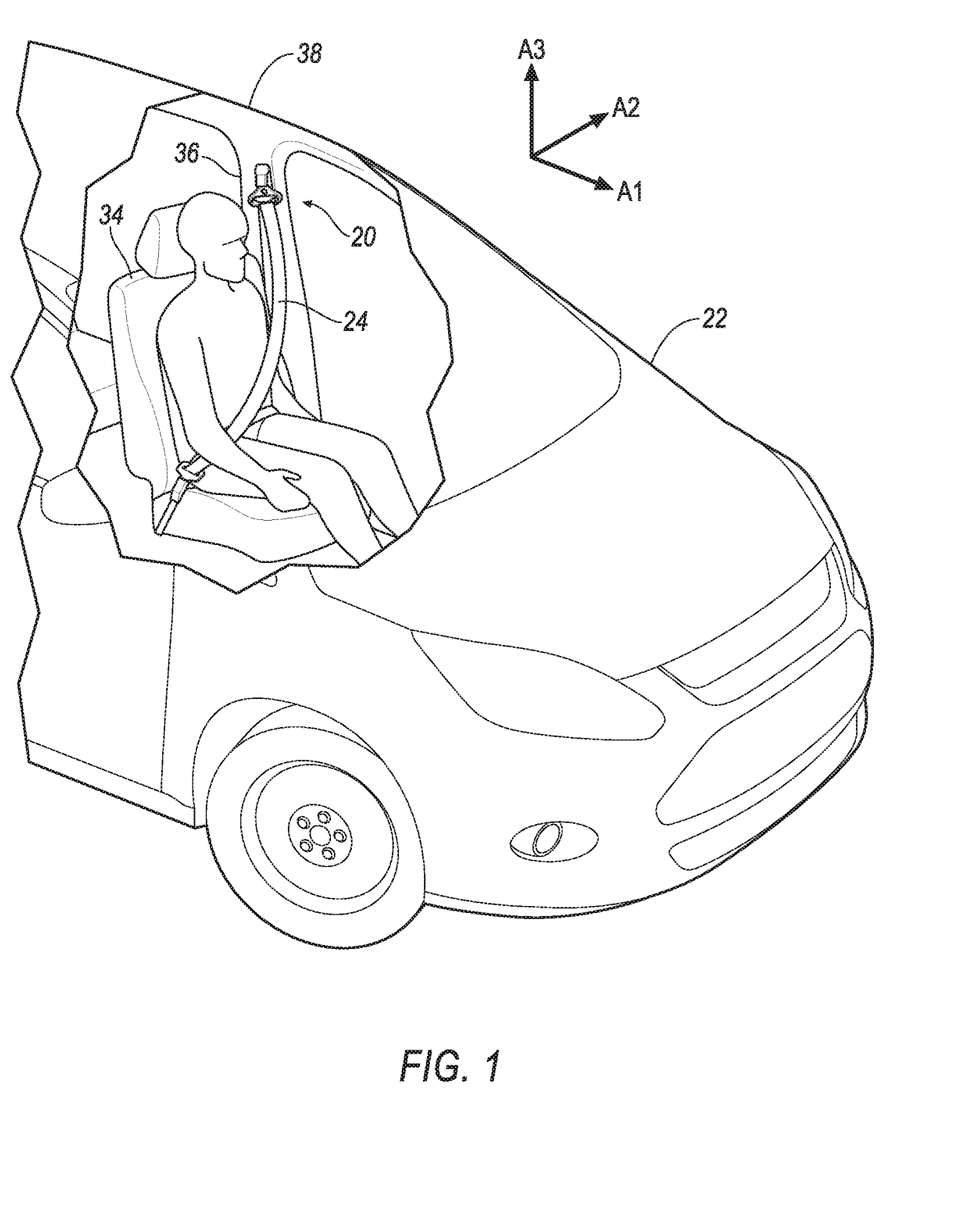
FIG. 1 is a perspective view of an example vehicle including a seatbelt assembly.

The vehicle 22 may be any passenger or commercial automobile such as a car, a truck, a sport utility vehicle, a crossover vehicle, a van, a minivan, a taxi, a bus, etc. The vehicle 22 may include the seatbelt assembly 20, one or more seats 34, one or more pillars 36 (i.e., vehicle pillars 36), a roof 38 (i.e., a vehicle roof 38), etc. The vehicle 22 defines a longitudinal axis A1, i.e., extending between a front and a rear of the vehicle 22. The vehicle 22 defines a lateral axis A2, i.e., extending between a left side and a right side of the vehicle 22, i.e., in a cross-vehicle direction. The vehicle 22 defines a vertical axis A3, i.e., extending between a top and a bottom of the vehicle 22. The longitudinal axis A1, the lateral axis A2, and the vertical axis A3 may all be perpendicular to each other. The directions front, rear, left, right, top, and bottom are all relative to an orientation of an operator of the vehicle 22, an orientation of controls for operating the vehicle 22, e.g., an instrument panel, a driving direction when wheels of the vehicle 22 are all parallel with each other, etc.

The vehicle 22 may include a body and a frame. The body and frame may be of a unibody construction. In the unibody construction, the body, e.g., rockers, pillars 36, the roof 38, etc., serve as the vehicle 22 frame. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, carbon fiber, etc.

Figure 5:
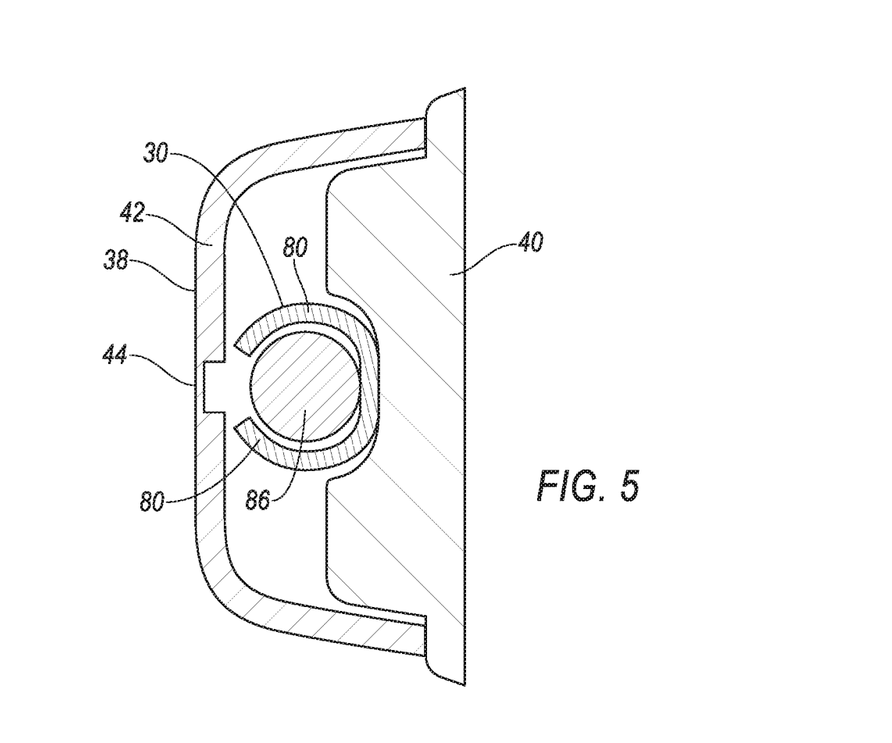
FIG. 5 is a cross section of a roof of the vehicle along line 5 in FIG. 3.

The roof 38 provides cover for occupants for the vehicle 22. The roof 38 may include an inner panel 40 and a trim cover 42, as shown in FIG. 5. The inner panel 40 provides support to the trim cover 42, an outer panel, a headliner, etc. The inner panel 40 may be made of steel, aluminum, carbon fiber, or any other suitable material. The trim cover 42 provides a class-A surface to the roof 38, i.e., a surface specifically manufactured to have a high-quality, finished aesthetic appearance free of blemishes, etc. The trim cover 42 may be plastic or any other suitable material.

The trim cover 42 of the roof 38 includes a tear seam 44. The tear seam 44 may be an area of weak material, a perforated area, etc., that enables to the trim cover 42 to tear along the tear seam 44. The tear seam 44 may extend along the longitudinal axis A1. The tear seam 44 of the roof 38 trim cover 42 may be adjacent the actuator 30, e.g., such that the roof 38 trim cover 42 tears along the tear seam 44 when the actuator 30 is actuated.

Figure 4:
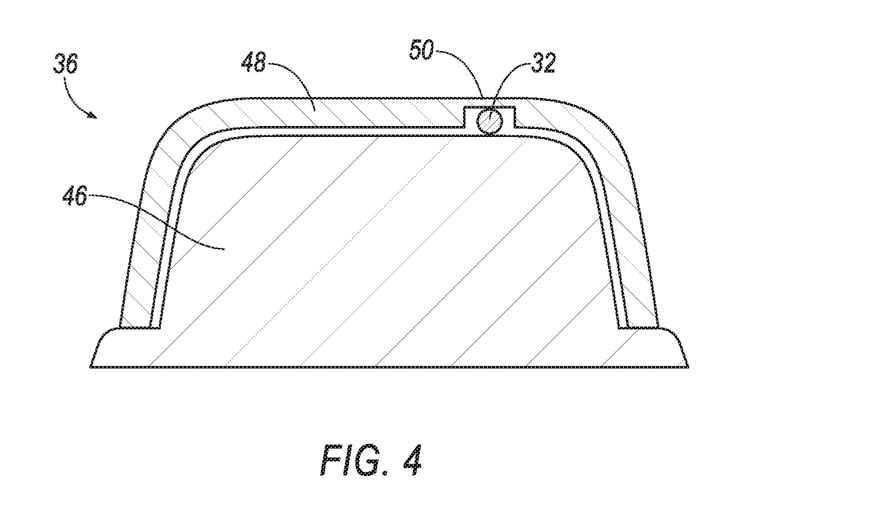
FIG. 4 is a cross section of a pillar of the vehicle along line 4 in FIG. 3.

The pillar 36 supports other vehicle 22 components, e.g., the roof 38, a door, the first webbing guide 26, etc. The pillar 36 may include an inner panel 46 and a trim cover 48, as shown in FIG. 4. The inner panel 46 provides support to the trim cover 48, an outer panel, the first webbing guide 26, etc. The inner panel 46 may be made of steel, aluminum, carbon fiber, or any other suitable material. The trim cover 48 provides a class-A surface to the pillar 36. The trim cover 48 may be plastic or any other suitable material.

The trim cover 48 of the pillar 36 includes a tear seam 50 adjacent the cable 32. The tear seam 50 may be an area of weak material, a perforated area, etc., that enables to the trim cover 48 to tear along the tear seam 50. The tear seam 50 may extend along the vertical axis A3. The tear seam 50 may extend between the first webbing guide 26 and the roof 38. The tear seam 50 of the pillar 36 trim cover 48 may be continuous with the tear seam 44 of the roof 38 trim cover 42.

The seatbelt assembly 20 restrains the occupant of the seat 34 and/or limits a displacement of the occupant relative to the seat 34, e.g., during an impact to the vehicle 22. The seatbelt assembly 20 may include a retractor and the webbing 24.

The retractor may be attached to a component of the vehicle 22, e.g. to one of the pillars 36, to one of the seats 34, etc. The retractor may be attached in any suitable manner, e.g., with one or more fasteners, etc. The retractor may include a spool. The spool may freely rotate within the retractor. The spool may be adapted to receive the webbing 24, for example, by including a webbing attachment slot and permitting the webbing 24 to wind around the spool. The retractor may include a locking mechanism that inhibits rotation of the spool when the vehicle 22 is subject to deceleration above a threshold amount, e.g., during the impact of the vehicle 22.

The webbing 24 may be formed of fabric in the shape of a strap. The webbing 24 may be attached to the spool, with the webbing 24 wound around the spool. The webbing 24 may be payable from the retractor, e.g., when the spool is not prevented from rotating by the locking mechanism.

The first webbing guide 26 receives the webbing 24, e.g., to position the webbing 24 relative to the occupant of the vehicle 22. The first webbing guide 26 may be supported by the pillar 36. For example, the first webbing guide 26 may be fixed to the inner panel 46 of the pillar 36, e.g., with a fastener, such as a bolt, etc. The first webbing guide 26 may be made of metal, plastic, etc., including combinations thereof.

Figure 6:
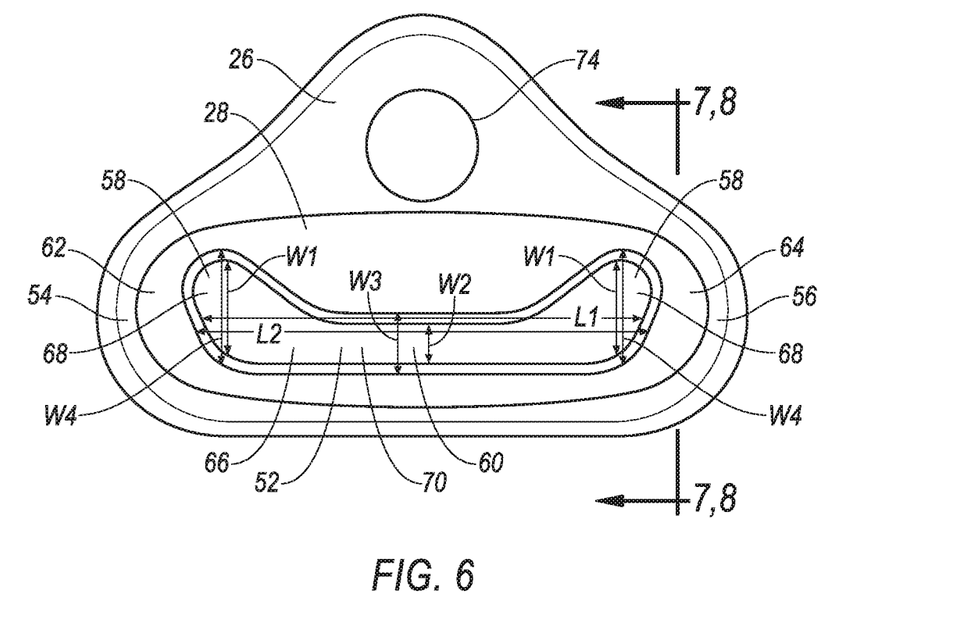
FIG. 6 is a front view of a first webbing guide and a second webbing guide.

The first webbing guide 26 may define a slot 52, as shown in FIG. 6. For example, first webbing guide 26 may include a first end 54 and a second end 56 spaced from the first end 54. The slot 52 may be elongated between the first end 54 and the second end 56. The slot 52 may have a length L1, e.g., between the first end 54 and the second end 56 of the first webbing guide 26. The slot 52 may have a width, e.g., perpendicular to the length L1. For example, the slot 52 may include end portions 58 at the first end 54 and the second end 56 having a width W1. For example, the slot 52 may include an intermediate portion 60 between the end portions 58 and having a width W2. The width W1 of the end portions 58 may be greater than the width W2 of the intermediate portion 60. The webbing 24 may be slidable within the slot 52.

The first webbing guide 26 may define one or more holes 74, e.g., to engage the bolt securing the first webbing guide 26 to the inner panel 40 of the pillar 36, to engage a frangible stake 76 releasably securing the second webbing guide 28 to the first webbing guide 26 (discussed below), etc.

The second webbing guide 28 receives the webbing 24, e.g., to position the webbing 24 relative to the occupant of the vehicle 22. For example, the second webbing guide 28 may include a first end 62 and a second end 64. The second end 64 may be spaced from the first end 62. The webbing 24 guide may define a slot 66 elongated between the first end 62 and the second end 64. The webbing 24 may be slidable within the slot 66. The slot 66 may include end portions 68 at the first end 62 and the second end 64. The slot 66 may include an intermediate portion 70 between the end portions 68. The slot 66 may have a length L2, e.g., between the first end 62 and the second end 64. The slot 66 may have a width, e.g., a width W3 at the intermediate portion 70 and perpendicular to the length L2, a width W4 at the end portions 68 and perpendicular to the length L2. The width W4 of the slot 66 at the end portions 68 may be greater than the width W4 of the slot 66 at the intermediate portion 70. To put it another way, the end portions 68 may be wider than the intermediate portion 70.

The slot 66 of the second webbing guide 28 may be larger than the slot 52 of the first webbing guide 26. For example, the length L2 of the slot 66 of the second webbing guide 28 may be greater than the length L1 of the slot 52 of the first webbing guide 26. For example, the width W3 at the intermediate portion 70 of the slot 66 of the second webbing guide 28 may be greater than the width W2 at the intermediate portion 60 of the slot 52 of the first webbing guide 26. For example, the width W4 at the end portion 68 of the slot 66 of the second webbing guide 28 may be greater than the width W1 at the end portion 58 of the slot 52 of the first webbing guide 26.

The second webbing guide 28 is releasably secured to the first webbing guide 26. For example, the second webbing guide 28 may be designed to release from the first webbing guide 26 upon application of a force F not less than a threshold amount, e.g., 200 pounds, to the second webbing guide 28. To put it another way, the second webbing guide 28 may be designed to not release from the first webbing guide 26 upon application of force than is less than the threshold amount. The threshold amount is large enough such that the second webbing guide 28 does not release from the first webbing guide 26 during normal operation of the vehicle 22, e.g., when the occupant restrains themselves with webbing 24, e.g., buckles the seatbelt assembly 20, when the occupant leans on the webbing 24, etc. The threshold amount may be empirically determined. The first webbing guide 26 may be releasably secured to the second webbing guide 28 with a frangible member 72, the frangible stake 76, clips 78, or other suitable structure, including combinations thereof.

Figure 8:
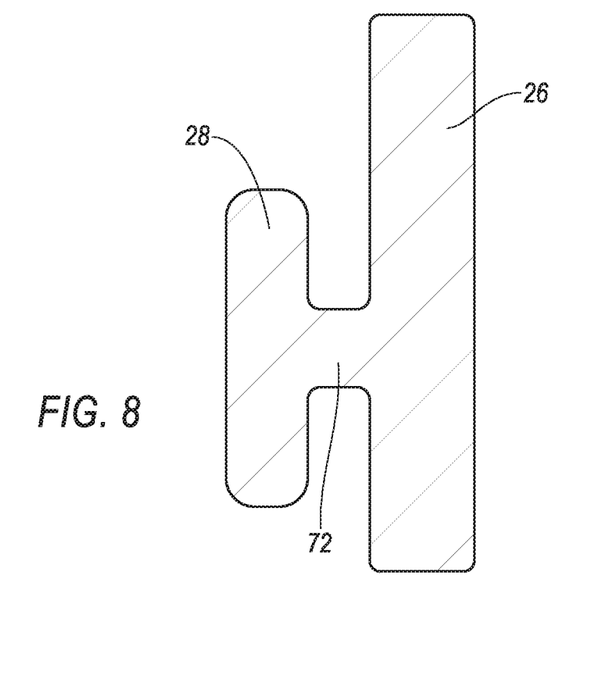
FIG. 8 is a cross section of another embodiment of the first webbing guide and the second webbing guide along line 7, 8 in FIG. 6.

The frangible member 72 may releasably secure the first webbing guide 26 to the second webbing guide 28, as shown in FIG. 8. The frangible member 72 is breakable relative to the first webbing guide 26 and the second webbing guide 28. To put it another way, application of the force F to the second webbing guide 28, e.g., from the actuator 30 and via the cable 32, may break the frangible member 72 and not the first webbing guide 26 or the second webbing guide 28. The frangible member 72 may be made of plastic or any other suitable material. The first webbing guide 26, the second webbing guide 28, and the frangible member 72 may be monolithic, i.e., a single piece with no seams, joints, fasteners, or adhesives holding the first webbing guide 26, the second webbing guide 28, and the frangible member 72 together. Alternately, the first webbing guide 26, the second webbing guide 28, and the frangible member 72 may be individual structures held together with fasteners, adhesives, friction welding, etc.

Figure 7:
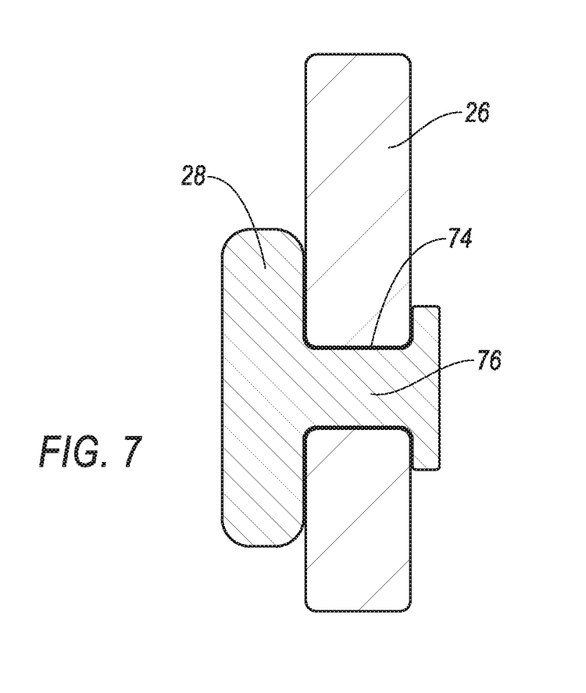
FIG. 7 is a cross section of the first webbing guide and the second webbing guide along line 7, 8 in FIG. 6.

The frangible stake 76 may releasably secure the first webbing guide 26 to the second webbing guide 28, as shown in FIG. 7. The frangible stake 76 is breakable relative to the first webbing guide 26 and the second webbing guide 28. To put it another way, application of the force F to the second webbing guide 28, e.g., from the actuator 30 and via the cable 32, may break the frangible stake 76 and not the first webbing guide 26 or the second webbing guide 28. The frangible stake 76 may be made of thermoplastic or any other suitable material. The frangible stake 76 may extend from the second webbing guide 28 and engage with one of the holes 74 of the first webbing guide 26. Alternately or additionally, one or more frangible stakes may extend from the first webbing guide and engage with holes of the second webbing guide (not shown).

Figure 9:
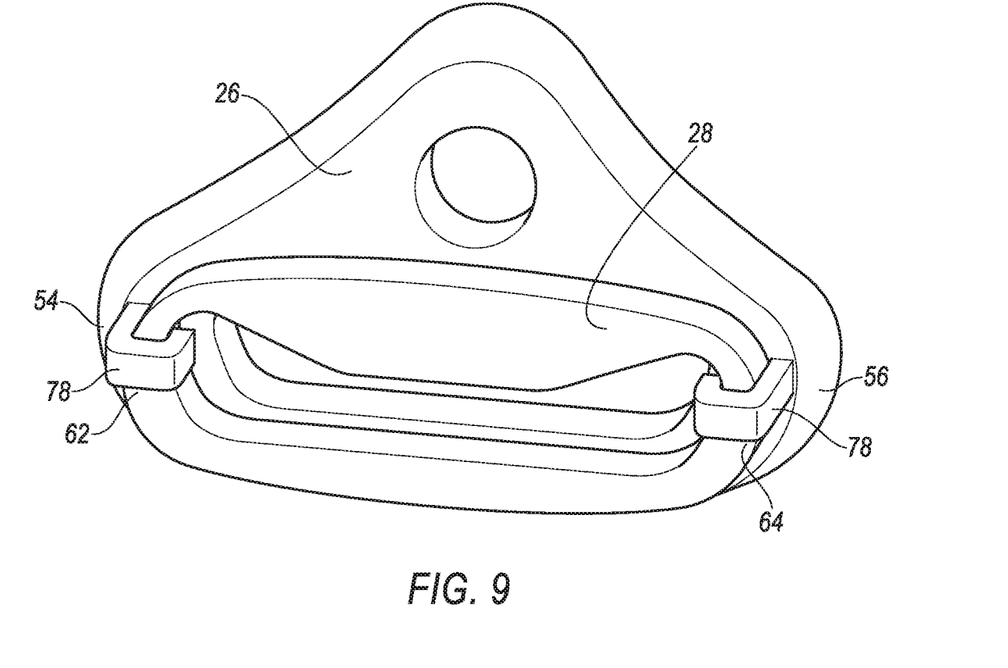
FIG. 9 is a perspective view of another embodiment of the first webbing guide and the second webbing guide.

One or more clips 78 may releasably secure the first webbing guide 26 to the second webbing guide 28, as shown in FIG. 9. The clips 78 may mechanically trap the second webbing guide 28. Application of the force F to the second webbing guide 28, e.g., from the actuator 30 and via the cable 32, may cause the clips 78 to flex or break and release the second webbing guide 28 from the first webbing guide 26. The clips 78 may be supported by the first webbing guide 26. The clips 78 and the first webbing guide 26 may be monolithic. Alternately or additionally, one or more clips may be supported by the second webbing guide and mechanically trap the first webbing guide (not shown).

The second webbing guide 28 is releasably secured to the first webbing guide 26 at the first end 54 and the second end 56. For example, the frangible members 72 may connect the first end 54 of the first webbing guide 26 with the first end 62 of the second webbing guide 28, and may connect the second end 56 of the first webbing guide 26 with the second end 64 of the second webbing guide 28. For example, the frangible stakes 76 may extend from the first end 62 and the second end 64 of the second webbing guide 28 and engage with holes 74 at the first end 54 and the second end 56 of the first webbing guide 26. For example, the clips 78 may be supported by the first end 54 and the second end 56 of the first webbing guide 26, and may mechanically trap the first end 62 and the second end 64 of the second webbing guide 28.

The actuator 30 creates tension in the cable 32 to release the second webbing guide 28 from the first webbing guide 26 and draw the second webbing guide 28 toward the front of the vehicle 22. The actuator 30 may be a linear actuator, a cable retractor, or any other suitable device capable of generating the threshold amount of force.

The actuator 30 may be supported by the roof 38. For example, the actuator 30 may be fixed to the inner panel 40, e.g., with a fastener, welding, etc. The actuator 30 may be located in a vehicle 22 forward position relative to the first webbing guide 26. To put it another way, the actuator 30 may closer to the front of the vehicle 22 than the first webbing guide 26. The actuator 30 may be disposed between the inner panel 40 and the trim cover 42 of the roof 38. To put it another way, the actuator 30 may be disposed behind the trim cover 42 of the roof 38, e.g., to hide the actuator 30 out of sight of an occupant of the vehicle 22.

The actuator 30 may include a track 80 having a first end 82 and a second end 84. The first end 82 may be proximate the pillar 36, i.e., the first end 82 may be closer to the pillar 36 than the second end 84 is to the pillar 36. The track 80 may have a cross section with a C-shape, as shown in FIG. 5. The track 80 may include one or more grooves, channels, lips, etc. A slide body 86 may be slidable along the track 80 from the first end 82 to the second end 84. For example, the slide body 86 may be a cylinder that is slip fit within the C-shape of the track 80. The slide body 86 may extend between a first end 88 and a second end 90. The first end 88 of the slide body 86 may be proximate the first end 82 of the track 80, e.g., prior to actuation of the actuator 30.

The actuator 30 may include a stop 92 at the second end 90 of the track 80. The stop 92 limits travel of the slide body 86 along the track 80. The stop 92 may be fixed to the track 80 with one or more fasteners, welding, adhesives, etc. The stop 92 and the track 80 may be monolithic. The track 80, slide body 86, and stop 92 may be metal or any other suitable material.

The actuator 30 may include a pyrotechnic 94. The pyrotechnic 94 may generate gas, or otherwise rapidly expand upon actuation, e.g., in response to an electrical impulse from a computer 96. Actuation of the pyrotechnic 94 causes the slide body 86 to move from the first end 82 of the track 80 toward the second end 84 of the track 80. For example, the pyrotechnic 94 may be supported by the track 80 at the first end 82, e.g., fixed to the track 80 with a fastener, adhesive, etc. For example, the pyrotechnic 94 may be supported by the slide body 86 at the first end 88, e.g., fixed to the slide body 86 with a fastener, adhesive, etc.

The cable 32 secures the actuator 30 to the second webbing guide 28. For example, one end of the cable 32 may be secured to the second webbing guide 28, e.g., with a fastener, welding, etc. An opposite end of the cable 32 may be secured to the actuator 30, e.g., to the slide body 86, e.g., with a fastener, welding, etc. The cable 32 may be disposed between the inner panel 46 and the trim cover 48. The cable 32 may extend along the tear seam 50 of the pillar 36 trim cover 48.

Figure 11:
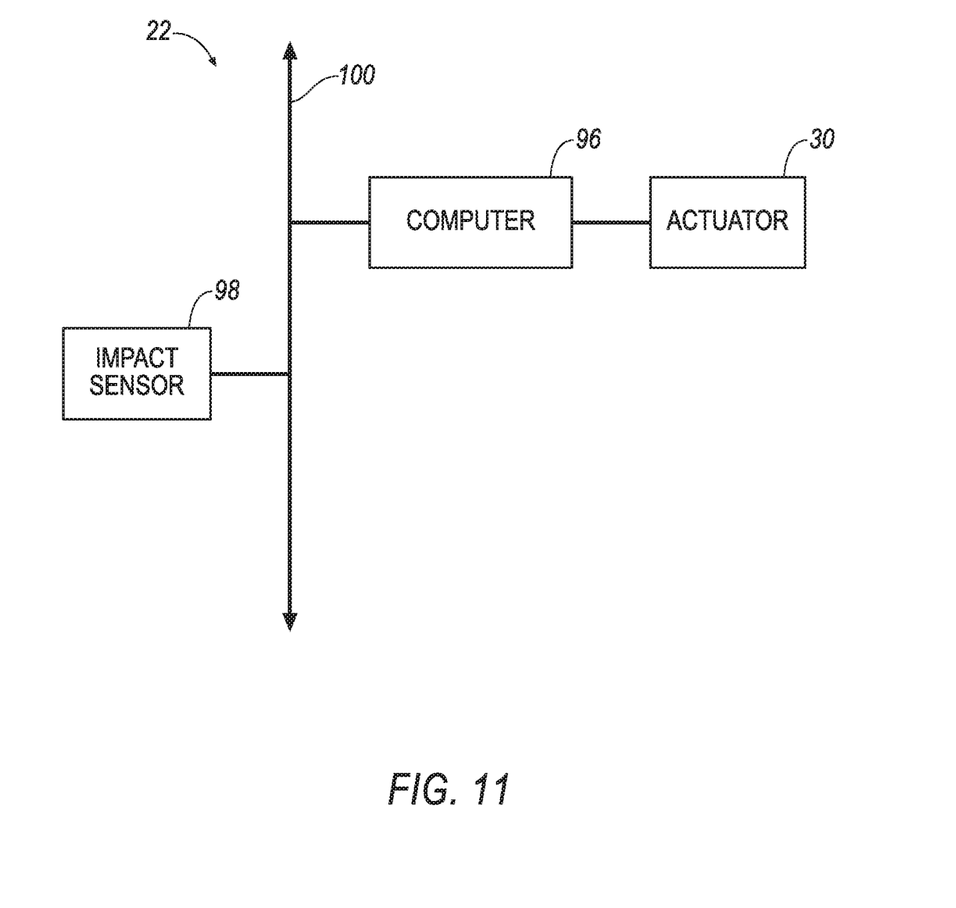
FIG. 11 is a block diagram of components of the vehicle.

With reference to FIG. 11, the vehicle 22 may include at least one impact sensor 98 for sensing impact of the vehicle 22. The impact sensor 98 is configured to detect an impact to the vehicle 22. The impact sensor 98 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 98 may be located at numerous points in or on the vehicle 22. Alternatively or additionally to sensing impact, the impact sensor 98 may be configured to sense impact prior to impact, i.e., pre-impact sensing.

The computer 96 may be a microprocessor-based computer implemented via circuits, chips, or other electronic components. For example, the computer 96 may include a processor, a memory, etc. The memory of the computer 96 may include memory for storing programming instructions executable by the processor as well as for electronically storing data and/or databases.

The computer 96 and the impact sensor 98 may be connected to a communication bus 100, such as a controller area network (CAN) bus, of the vehicle 22. The computer 96 may use information from the communication bus 100, e.g., from the impact sensors 98 to control the actuation of the actuator 30. The actuator 30 may be connected directly to the computer 96, as shown in FIG. 11, or the actuator 30 may be connected via the communication bus 100.

The memory stores instructions executable by the processor to actuate the actuator 30 upon detecting a vehicle 22 impact. For example, the computer 96 may identify the vehicle 22 impact based on information received from the one or more impact sensors 98, e.g., via the communication bus 100. Upon identifying the vehicle 22 impact the computer 96 may transmit a command to the actuator 30 instructing the actuator 30 to actuate to create tension in the cable 32. For example, the computer 96 may transmit an electric impulse to the pyrotechnic 94.

Figure 2:
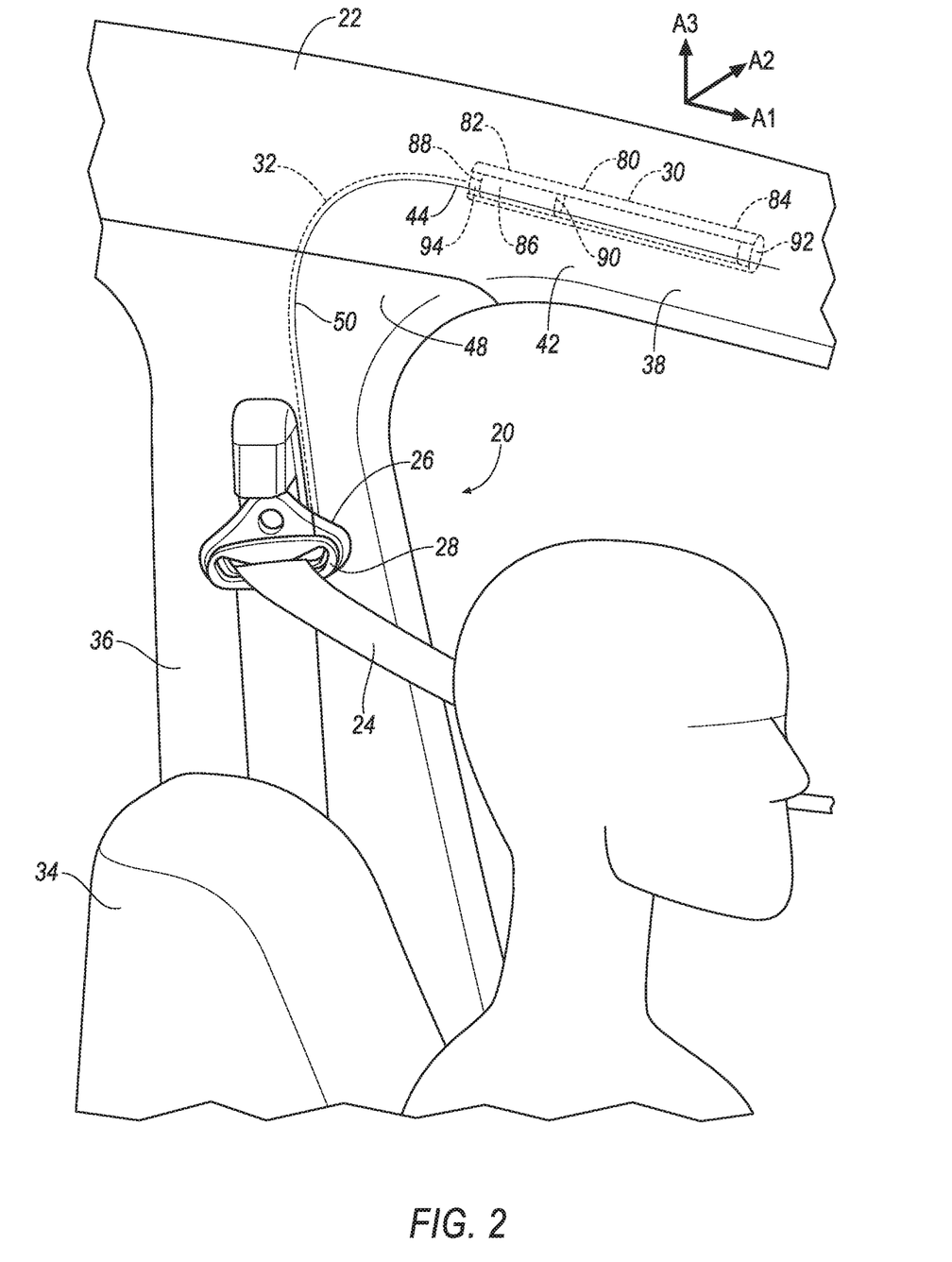
FIG. 2 is a perspective view of an interior the example vehicle and the seatbelt assembly.
Figure 3:
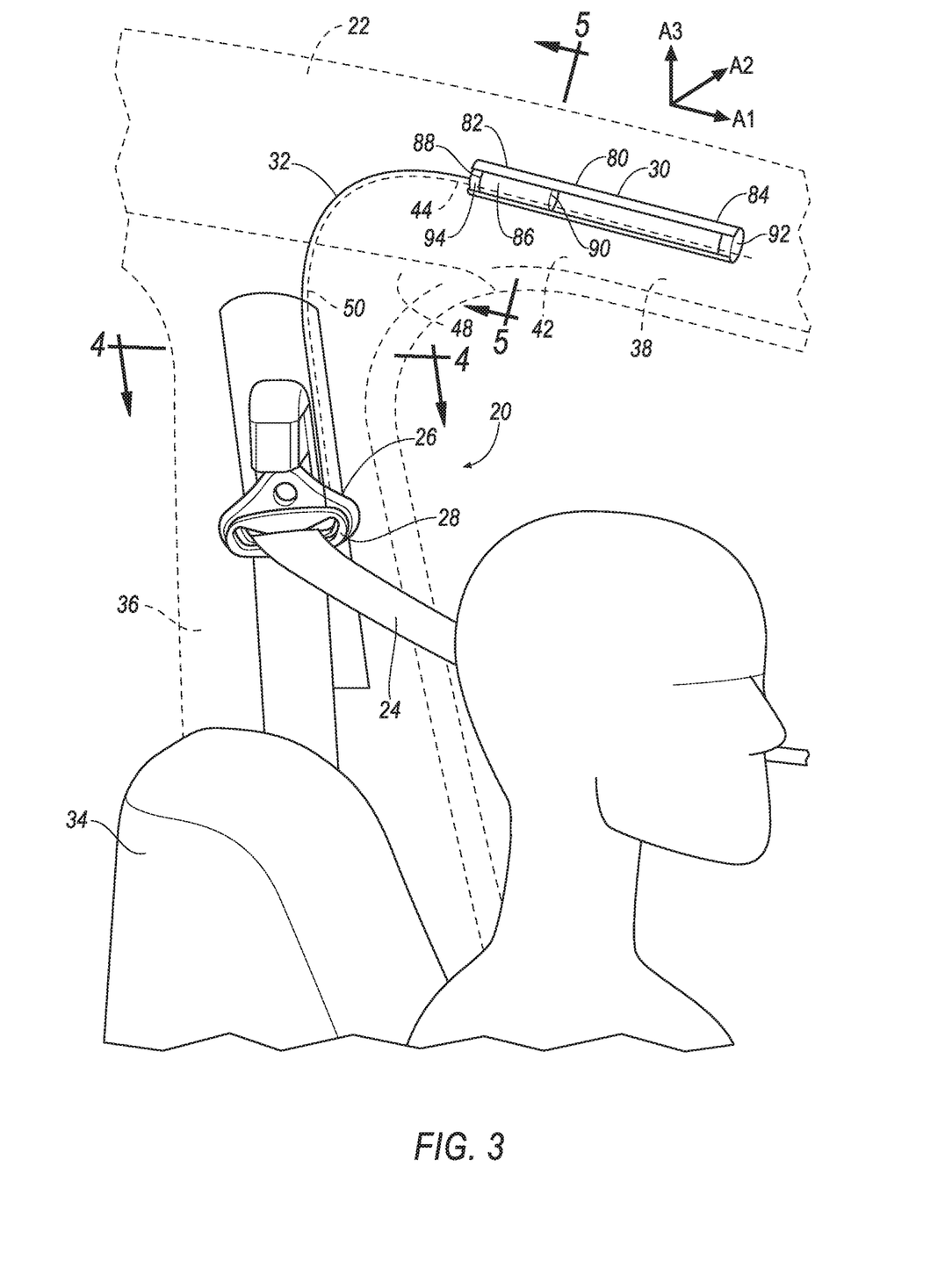
FIG. 3 is a perspective view of the interior the example vehicle and the seatbelt assembly.
Figure 10:
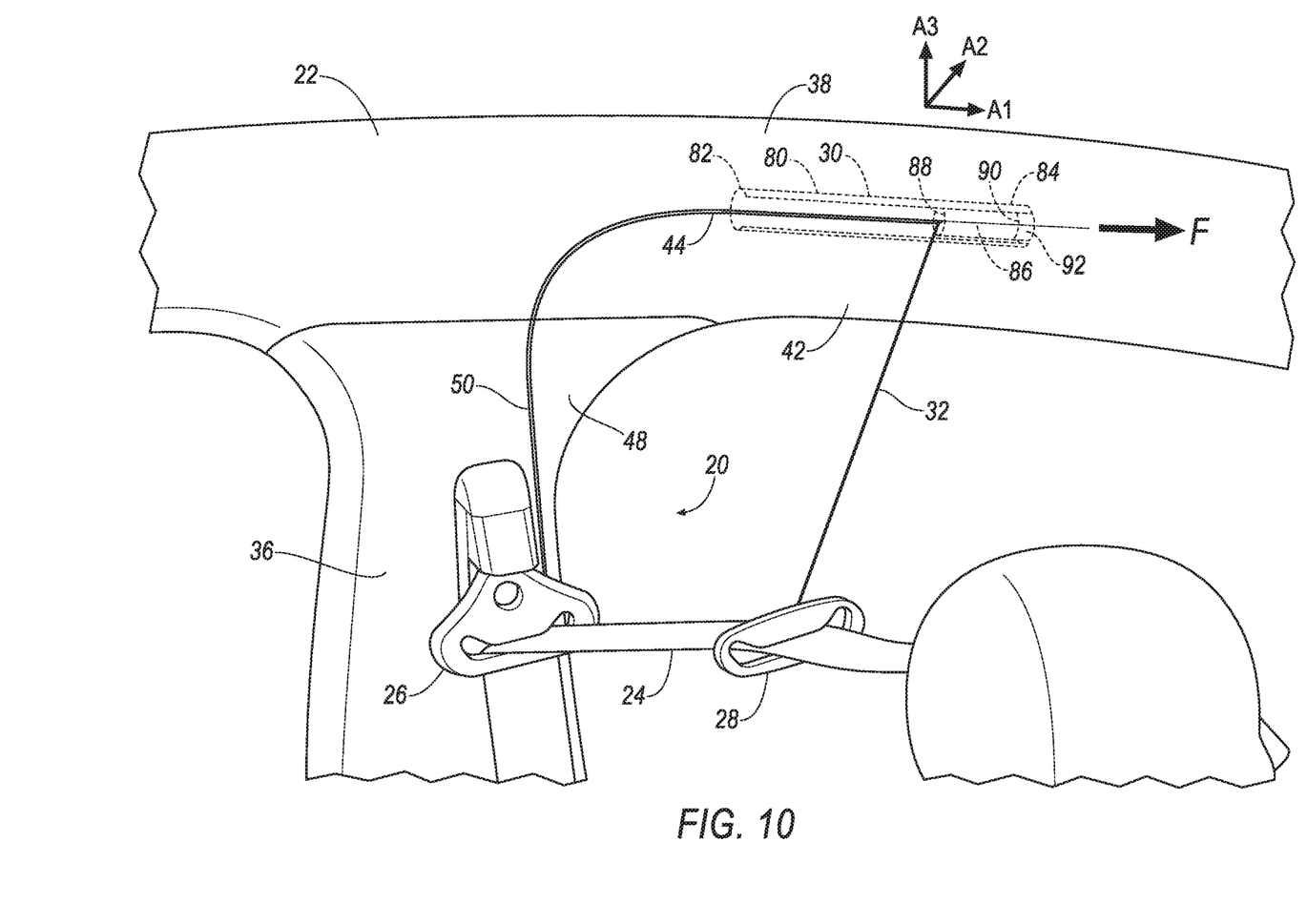
FIG. 10 is a perspective view of the interior the example vehicle and the seatbelt assembly after actuation.

In operation, the second webbing guide 28 is releasably secured to the first webbing guide 26, the cable 32 is disposed between the pillar 36 panel and trim cover 48, and end of the cable 32 secured to the slide body 86 is in a first position, e.g., at the first end 82 of the track 80, as shown in FIGS. 2 and 3. Upon identifying the vehicle 22 impact, the computer 96 transmits the electric pulse to the pyrotechnic 94, causing it to detonate. Detonation of the pyrotechnic 94 moves the slide body 86, and end of the cable 32 secured to the slide body 86, along the track 80 and in the vehicle 22 forward direction, i.e., along the longitudinal axis A1, to a second position that is at the second end 84 of the track 80, as shown in FIG. 10. Moving the slide body 86, and end of the cable 32 secured to the slide body 86, to the second end 84 of the track 80 creates tension force in the cable 32, causing the trim covers 42, 48 to tear along the tear seams 44, 50, releasing the second webbing guide 28 from the first webbing guide 26, and drawing the second webbing guide 28, and the webbing 24 received therein, in the vehicle 22 forward direction to create slack in the webbing 24 relative to the occupant restrained by the seatbelt assembly 20, e.g., reducing a likelihood of injury to the occupant's chest and/or abdomen during impacts to the vehicle 22.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a vehicle pillar that includes a panel and a trim cover;
a webbing;
a first webbing guide receiving the webbing, the first webbing guide supported by the vehicle pillar;
a second webbing guide receiving the webbing and releasably secured to the first webbing guide;
an actuator including a pyrotechnic; and
a cable secured to the actuator and to the second webbing guide, the cable disposed between the panel and the trim cover.

2. The assembly of claim 1, wherein the second webbing guide is releasable from the first webbing guide upon application of a force not less than 200 pounds to the second webbing guide.

3. The assembly of claim 1, wherein the first webbing guide defines a slot, and the second webbing guide defines a slot that is larger than the slot of the first webbing guide.

4. The assembly of claim 1, wherein the second webbing guide includes a first end, a second end spaced from the first end, and defines a slot elongated between the first end and the second end, the second webbing guide releasably secured to the first webbing guide at the first end and the second end.

5. The assembly of claim 1, wherein the actuator includes a track having a first end and a second end, and a slide body slidable along the track from the first end to the second end.

6. The assembly of claim 5, wherein the actuator includes a stop at the second end of the track.

7. The assembly of claim 1, wherein the second webbing guide defines a slot including end portions and an intermediate portion between the end portions, the end portions being wider than the intermediate portion.

8. The assembly of claim 1, wherein the first webbing guide and the second webbing guide are monolithic.

9. The assembly of claim 1, wherein the first webbing guide defines a hole, and the second webbing guide includes a frangible stake breakable relative to the first webbing guide and the second webbing guide and engaged with the hole.

10. The assembly of claim 1, further comprising a vehicle roof, the actuator supported by the vehicle roof.

11. The assembly of claim 10, wherein the vehicle roof includes a panel and a trim cover, the actuator disposed between the panel and the trim cover of the vehicle roof.

12. The assembly of claim 11, wherein the trim cover of the vehicle roof includes a tear seam adjacent the actuator.

13. The assembly of claim 1, further comprising a processor and a memory, the memory storing instructions executable by the processor to actuate the actuator upon detecting a vehicle impact.

14. The assembly of claim 1, wherein the cable includes an end secured to the actuator and moveable from a first position to a second position that is in a vehicle forward direction relative to the first position.

15. The assembly of claim 1, wherein the actuator is located in a vehicle forward position relative to the first webbing guide.

16. An assembly, comprising:
a webbing;
a first webbing guide receiving the webbing;

a second webbing guide receiving the webbing and releasably secured to the first webbing guide;
a frangible member breakable relative to the first webbing guide and the second webbing guide and releasably securing the first webbing guide to the second webbing guide;
an actuator; and
a cable secured to the actuator and to the second webbing guide.

17. An assembly, comprising:
a vehicle pillar including a panel and a trim cover;
a webbing;
a first webbing guide supported by the vehicle pillar and receiving the webbing;
a second webbing guide receiving the webbing and releasably secured to the first webbing guide;
an actuator; and
a cable secured to the actuator and to the second webbing guide, the cable disposed between the panel and the trim cover;
wherein the trim cover includes a tear seam adjacent the cable.

* * * * *